(12) United States Patent
Kalakanti et al.

(10) Patent No.: US 10,937,112 B2
(45) Date of Patent: Mar. 2, 2021

(54) SYSTEM, METHOD AND DEVICE FOR CREATING A POWER GENERATION PLAN IN A POWER GENERATION SYSTEM

(71) Applicant: KABUSHIKI KAISHA TOSHIBA, Minato-ku (JP)

(72) Inventors: Arun Kumar Kalakanti, Bangalore (IN); Charitha Hanumantharaju, Bangalore (IN); Girish Babu Meruva, Bangalore (IN); Topon Paul, Kawasaki (JP); Shuichiro Imahara, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 80 days.

(21) Appl. No.: 16/104,178

(22) Filed: Aug. 17, 2018

(65) Prior Publication Data
US 2020/0058082 A1 Feb. 20, 2020

(51) Int. Cl.
*G06Q 10/06* (2012.01)
*G06Q 50/06* (2012.01)
(Continued)

(52) U.S. Cl.
CPC ............ *G06Q 50/06* (2013.01); *H02J 3/0075* (2020.01); *H02J 3/466* (2020.01)

(58) Field of Classification Search
CPC ....... G06Q 50/06; H02J 11/00; H04W 72/042
See application file for complete search history.

(56) References Cited

U.S. PATENT DOCUMENTS 7,085,660 B2 * 8/2006 Mansingh .............. G06Q 50/06
 702/60
7,321,810 B2 * 1/2008 Mansingh ................ H02J 3/00
 700/286
(Continued)

FOREIGN PATENT DOCUMENTS

CN 103559387 B 2/2014
JP 60-128831 7/1985
(Continued)

OTHER PUBLICATIONS

Saravanan et al, "A solution to the unit commitment problem-a review", 2013, pp. 223-226, downloaded from the internet at https://link.springer.com/article/10.1007/s11708-013-0240-3 (Year: 2013).*

(Continued)

*Primary Examiner* — Rocio Del Mar Perez-Velez
*Assistant Examiner* — Olvin Lopez Alvarez
(74) *Attorney, Agent, or Firm* — Oblon, McClelland, Maier & Neustadt, L.L.P.

(57) ABSTRACT

The present disclosure relates to a method, system and device for power generation planning in a power generation system. The power generation system comprises a plurality of Power Generation Units (PGUs). The system receives a power demand data indicative of power required over a pre-defined time period, by a load. A pattern in variation of power among various patterns is identified for each of one or more intervals in the pre-defined time period. An operation technique and a repair technique are determined for each of the one or more intervals based on the pattern. A plurality of working patterns for operating the plurality of PGUs is determined in each of the one or more intervals based on determined operational technique and repair technique for corresponding one or more intervals. System determines individual power outputs to be generated by the (Continued)

number of PGUs determined in each of the plurality of working patterns.

20 Claims, 7 Drawing Sheets

(51) Int. Cl.
*H02J 3/00* (2006.01)
*H02J 3/46* (2006.01)

(56) References Cited

U.S. PATENT DOCUMENTS

| | | | |
|---|---|---|---|
| 7,454,270 | B2 | 11/2008 | Mansingh et al. |
| 7,752,150 | B2* | 7/2010 | Ye .................... G06N 3/126 706/13 |
| 8,606,420 | B2 | 12/2013 | Kalagnanam et al. |
| 2008/0154810 | A1* | 6/2008 | Ye .................... G06N 3/126 706/13 |
| 2009/0062969 | A1* | 3/2009 | Chandra ............... G06Q 10/06 700/291 |
| 2009/0327177 | A1* | 12/2009 | Kirovski ................ G06F 17/11 706/13 |
| 2012/0054139 | A1* | 3/2012 | Nikovski ............. G05B 13/024 706/46 |
| 2012/0296482 | A1* | 11/2012 | Steven .................. G06Q 50/06 700/291 |
| 2013/0013121 | A1* | 1/2013 | Henze .................. G06Q 10/04 700/291 |
| 2013/0110751 | A1 | 5/2013 | Sheta et al. |
| 2014/0025351 | A1* | 1/2014 | Ghosh ................ G06F 17/5009 703/2 |
| 2014/0039702 | A1* | 2/2014 | Ilic ........................ G05B 15/02 700/286 |
| 2014/0277599 | A1* | 9/2014 | Pande ................... G06Q 50/06 700/22 |
| 2015/0184550 | A1* | 7/2015 | Wichmann ............. G05B 13/04 700/287 |
| 2016/0314480 | A1* | 10/2016 | Marecek ............ G06Q 30/0202 |
| 2017/0364043 | A1* | 12/2017 | Ganti ................... G05B 13/048 |
| 2018/0103302 | A1* | 4/2018 | Bell ....................... G01R 35/00 |
| 2018/0107965 | A1* | 4/2018 | Namboothiri .. G06Q 10/063112 |
| 2018/0217568 | A1* | 8/2018 | Parvania ............... H02J 7/0071 |
| 2019/0165580 | A1* | 5/2019 | Doherty ............... G05B 13/042 |
| 2019/0235994 | A1* | 8/2019 | Epperlein ........... G06F 11/3664 |
| 2019/0258970 | A1* | 8/2019 | Ali ......................... G06F 17/11 |

FOREIGN PATENT DOCUMENTS

| | | |
|---|---|---|
| JP | 2001-258157 | 9/2001 |
| JP | 4896084 | 3/2012 |
| JP | 2013-13178 A | 1/2013 |
| JP | 2013-106367 A | 5/2013 |
| JP | 2014-165946 | 9/2014 |
| JP | 2016-63609 | 4/2016 |
| JP | 2017-84346 | 5/2017 |
| JP | 2017-84347 | 5/2017 |
| JP | 2018-129989 A | 8/2018 |

OTHER PUBLICATIONS

CHeng et al, "Unit Commitment by Lagrangian Relaxation and Genetic Algorithms", May 2000, pp. 707-714, downloaded from the internet https://ieeexplore.ieee.org/stamp/stamp.jsp?arnumber=867163 (Year: 2000).*

Zhu, "Optimization of Power System Operation: Unit Commitment", 2009, pp. 251-295. (Year: 2009).*

Osorio et al, "A new scenario generation-based method to solve the unit commitment problem with high penetration of renewable energies", 2015, pp. 1063-1072, downloaded from the internet https://www.sciencedirect.com/science/article/pii/S0142061514005614 (Year: 2015).*

Ongsakul et al, "Ramp Rate Constrained Unit Commitment by Improved Adaptive Lagrangian Relaxation", 2005, pp. 2-175-2-194, downloaded from the internet, http://www.google.com/url?sa=t&rct=j&q (Year: 2005).*

Jeong et al, "Thermal Unit Commitment Using Binary Differential Evolution", 2009, pp. 323-329, downloaded from the internet https://pdfs.semanticscholar.org/9c87/e9e9a36b138051ee4e7d93df050415fb0175.pdf (Year: 2009).*

Chandrasekaran et al, "Multi-objective unit commitment problem using Cuckoo search Lagrangian method", 2012, International Journal of Engineering, Science and Technology vol. 4, No. 2, 2012, pp. 89-105, (Year: 2016).*

Arroyo et al, "A Parallel Repair Genetic Algorithm to Solve the Unit Commitment Problem", 2002, IEEE Transactions on Power Systems, vol. 17, No. 4, Nov. 2002, pp. 1216-1224 (Year: 2002).*

Vargas et al, "Tackling Unit Commitment and Load Dispatch Problems Considering All Constraints with Evolutionary Computation", Mar. 6, 2009, pp. 1-13, downloaded from the internet https://www.researchgate.net/publication/331978487_Tackling_Unit_Commitment_and_Load_Dispatch_Problems . . . (Year: 2009).*

Jeong et al, "A New Quantum-Inspired Binary PSO: Application to Unit Commitment Problems for Power Systems", 2010, IEEE Transactions on Power Systems, vol. 25, No. 3, Aug. 2010, pp. 1486-1495. (Year: 2010).*

Wu et al, "Binary neighbourhood field optimisation for unit commitment problems", 2012, pp. 298-308, downloaded from the internet https://ieeexplore.ieee.org/stamp/stamp.jsp?arnumber=6519643 (Year: 2012).*

Roque, "Optimization Methods for the Unit Commitment Problem in Electric Power", 2014, pp. 186, downloaded from the internet http://citeseerx.ist.psu.edu/viewdoc/download?doi=10.1.1.990.3072&rep=rep1&type=pdf (Year: 2014).*

Zhao et al, "A Hybrid Method of Lagrangian Relaxation and Genetic Algorithm for Solving UC problem", Apr. 2009, pp. 1-6 downloaded from the internet https://ieeexplore.ieee.org/document/5347917 (Year: 2009).*

Rajan, "Genetic Algorithm Based Simulated Annealing Method for Solving Unit Commitment Problem in Utility System", 2010, pp. 1-6 downloaded from the internet https://ieeexplore.ieee.org/document/5484351 (Year: 2010).*

Qiao et al, "Research of Peak and Valley Period Partition Approach on Statistics", 2011, pp. 1774-1779 downloaded from the internet https://ieeexplore.ieee.org/document/5994186 (Year: 2011).*

Zhang, W., et al. "Online Optimal Generation Control Based on Constrained Distributed Gradient Algorithm", IEEE Transactions on Power Systems, vol. 30, Issue 1, 2015, 11 pages.

Kumar, R., et al. "A hybrid multi-agent based particle swarm optimization algorithm for economic power dispatch", International Journal of Electrical Power & Energy Systems, vol. 33, Issue 1, 2011, pp. 115-123.

Datta, D. "Unit commitment problem with ramp rate constraint using a binary-real-coded genetic algorithm", Applied Soft Computing, vol. 13, 2013, pp. 3873-3883.

\* cited by examiner

SYSTEM, METHOD AND DEVICE FOR CREATING A POWER GENERATION PLAN IN A POWER GENERATION SYSTEM

The present invention is related, in general, to power generation system, and more particularly, but not exclusively, to a system, method and device for power generation planning in a power generation system, the power generation system comprising a plurality of Power Generation Units (PGUs) configured to generate power.

BACKGROUND

Power generation systems comprises of a plurality of Power Generation Units (PGUs) configured for generating power. The power generation system generates power based on the power demand from a load over a given time period. The off-peak and on-peak demands of power requirement may vary for different purposes and different loads. In order to tackle the varying demand in power requirement, the PGUs have to be monitored in an efficient manner. If the power generated by the PGUs are monitored efficiently, it may be possible to turn off some PGUs when power demand is less, for instance the power demand may be lesser at night compared to the day time resulting in reduction of power generation cost. Unit Commitment Problem (UCP) is an optimization problem used to determine the operation schedule of the PGUs over the given time period with varying power requirements and under different constraints and environments. The operation schedule consists of determining the turning ON/OFF schedules of the PGUs and the output power of the turned ON PGUs, which is called Economic Load Dispatch Problem (EDP). The existing methodologies, based on the average cost of power generation, turn on a PGU when the PGUs in operation (turned ON PGUs) cannot meet the power demand and turn off a PGU when power demand is lower and other operating (turned ON) PGUs can meet the power demand. The existing methodologies set the output power of the turned ON PGUs to maximum power of the PGUs except the most expensive one which may not output maximum power depending on the power demand. To create a power generation plan based on this approach the existing methodologies have difficulty in finding a power generation plan that satisfies all the constraints because the search space is huge and the cost of generating power based on the power generation plan may not be cheaper. Therefore, it is needed to reduce the search space and find a power generation plan with cheaper cost satisfying all the constraints.

The fuel cost ($/hour) of a power generation unit is an approximately quadratic cost function of the power output (MW, megawatts). This fuel cost component may be the major factor affecting the generation of power. Since the power generation plan is a combination of output power from the PGUs in the power system, determination of optimal power output is of utmost importance because it may lead to significant savings per year in large power generation systems. The existing methodologies used for providing solutions to the economic dispatch of generation are less efficient. The existing methodologies do not consider the time constraints involved in providing an efficient solution and hence are time consuming Thus, an efficient system is required for planning the operating time (turning on/off time) and power outputs of the PGUs such that it satisfies all the constraints.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to a method for creating a power generation plan in a power generation system. The power generation system comprises a plurality of Power Generation Units (PGUs) configured to generate power. The method comprises receiving, by a power management system, a power demand data, indicative of power required over a pre-defined time period, by a load connected to the power generation system. The power demand data is used for determining a variation of power demand over the pre-defined time period. Further, the method comprises identifying a pattern in variation of power demand among various patterns for each of one or more intervals in the pre-defined time period. Thereafter, the method comprises determining an operational technique from one or more operational techniques and a repair technique from a plurality of repair techniques, for each of the one or more intervals based on the pattern. Furthermore, the method comprises determining a plurality of working patterns for operating the plurality of PGUs in each of the one or more intervals based on the determined operational technique and the repair technique for the corresponding one or more intervals. Each of the plurality of working patterns is indicative of a number of PGUs operated in each of the one or more intervals, for generating power. Finally, the method comprises instructing the power generation system for operating the plurality of PGUs in the determined working pattern.

In an embodiment, the present disclosure relates to a power management system for power generation planning in a power generation system. The power generation system comprises a plurality of Power Generation Units (PGUs) configured to generate power. The power management system comprises a processor and a memory, communicably coupled with the processor, storing processor executable instructions, which, on execution causes the processor to receive, a power demand data indicative of power demand required over a pre-defined time period, by a load connected to the power generation system. The power demand data is used for determining a variation of power over the pre-defined time period. Further, the processor is configured to identify a pattern in variation of power among various patterns for each of one or more intervals in the pre-defined time period. Thereafter, the processor is configured to determine an operational technique from one or more operational techniques and a repair technique from a plurality of repair techniques, for each of the one or more intervals based on the pattern. Furthermore, the processor is configured to determine a plurality of working patterns for operating the plurality of PGUs in each of the one or more intervals based on the determined operational technique and the repair technique for the corresponding one or more intervals. Each of the plurality of working patterns is indicative of a number of PGUs operated in each of the one or more intervals, for generating power. Further, the system instructs the power generation system for operating the plurality of PGUs in the determined working pattern.

In an embodiment, the present disclosure relates to a power management device, for power generation planning in a power generation system. The power generation system comprises a plurality of Power Generation Units (PGUs)

configured to generate power. The power management devices comprise a circuitry consisting of a processor and a memory, communicably coupled with the processor, storing processor executable instructions, which, on execution causes the processor to receive, a power demand data indicative of power required over a pre-defined time period, by a load connected to the power generation system, wherein the power demand data is used for determining a variation of power over the pre-defined time period. Further, the circuitry is configured to identify a pattern in variation of power among various patterns for each of one or more intervals in the pre-defined time period. Thereafter, the circuitry is configured to determine an operational technique from one or more operational techniques and a repair technique from a plurality of repair techniques, for each of the one or more intervals based on the pattern. Furthermore, the circuitry is configured to determine a plurality of working patterns for operating the plurality of PGUs in each of the one or more intervals based on the determined operational technique and the repair technique for the corresponding one or more intervals. Each of the plurality of working patterns is indicative of a number of PGUs operated in each of the one or more intervals, for generating power. Further, the power management device instructs the power generation system for operating the plurality of PGUs in the determined working pattern.

In an embodiment, the present disclose relates to a non-transitory computer readable medium including instruction stored thereon that when processed by at least one processor cause a power management system to receive, a power demand data indicative of power required over a pre-defined time period, by a load connected to the power generation system. The power demand data is used for determining a variation of power demand over the pre-defined time period. Further, the processor identifies a pattern in variation of power among various patterns for each of one or more intervals in the pre-defined time period. Thereafter, the processor determines an operational technique from one or more operational techniques and a repair technique from a plurality of repair techniques, for each of the one or more intervals based on the pattern. Furthermore, the processor determines a plurality of working patterns for operating the plurality of PGUs in each of the one or more intervals based on the determined operational technique and the repair technique for the corresponding one or more intervals. Each of the plurality of working patterns is indicative of a number of PGUs operated in each of the one or more intervals, for generating power. Further, the medium instructs the power generation system for operating the plurality of PGUs in the determined working pattern.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods and/or device in accordance with embodiments of the present subject matter are now described, by way of example only, and with reference to the accompanying figures, in which:

Figure 1:
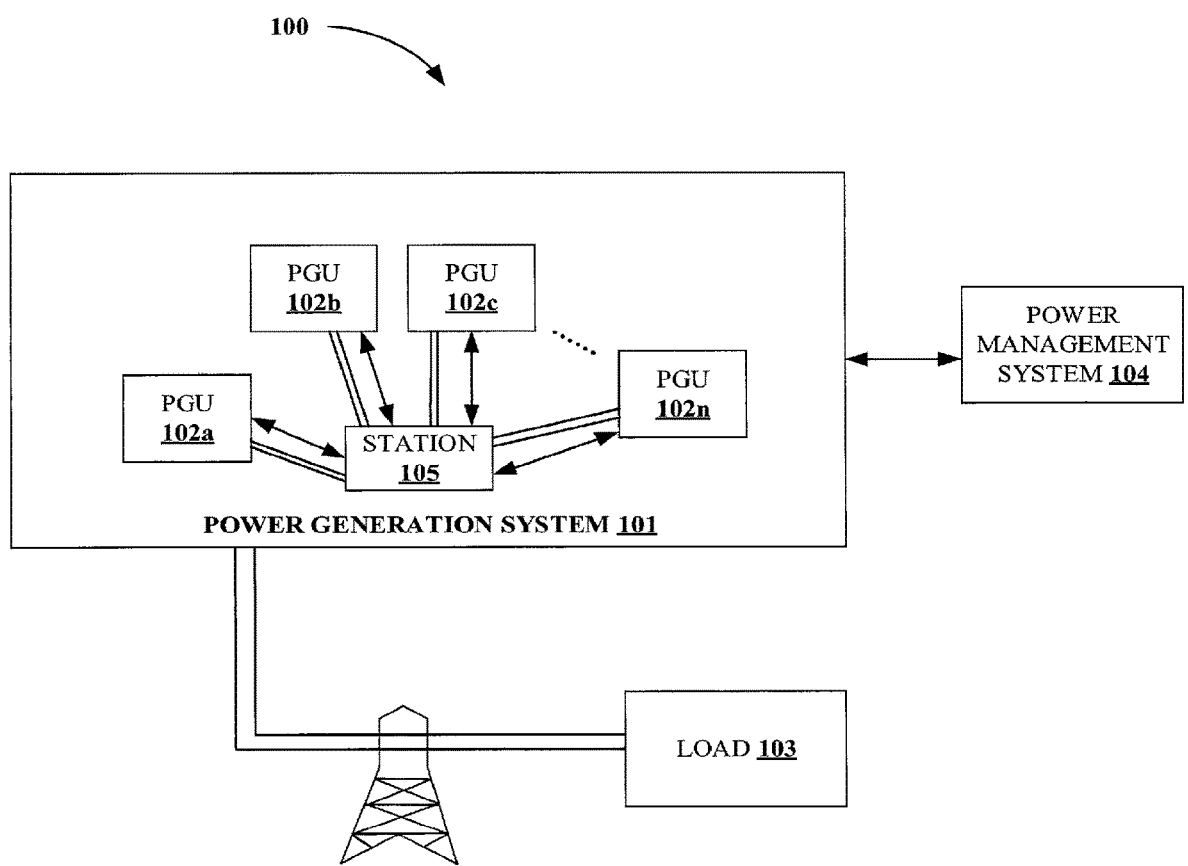
FIG. 1 shows an exemplary environment illustrative of a power generation system, in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to a system, method and device for managing generation of power in a power generation system. The power generation system comprises a plurality of Power Generation Units (PGUs). The system receives a power demand data indicative of power required over a pre-defined time period, by a load. Thereafter, a pattern in variation of power among various patterns is identified for each of one or more intervals in the pre-defined time period. An operation technique and a repair technique are determined for each of the one or more intervals based on the pattern. A plurality of working patterns for operating the plurality of PGUs is determined in each of the one or more intervals based on determined operational technique and repair technique for corresponding one or more intervals. The system determines individual power outputs to be generated by the number of PGUs determined in each of the plurality of working patterns.

FIG. 1 shows an exemplary environment 100 illustrative of a power generation system 101 and a power management system 104 for managing generation of power by the power generation system 101 in accordance with some embodiments of the present disclosure. The environment 100 comprises a load 103. The 101 may be nuclear power generation system, thermal power generation system, hydroelectric power generation system, geothermal power generations system and the like. The 101 comprises a Power Generation Unit (PGU) 102a, a PGU 102b, a PGU 102c, . . . , a PGU 102n. The PGU 102a, the PGU 102b, the PGU 102c, . . . , the PGU 102n may be referred to as a plurality of PGUs 102 hereafter in the present disclosure. The plurality of PGUs 102 are configured to generate power. The power generated by the plurality of PGUs 102 may be supplied to a station 105 via power lines (indicated by double ended line) Further, the plurality of PGUs may be connected to the station 105 via communication lines (indicated by bi-directional arrow, where the arrow indicates the direction of communication). The power generated by the plurality of PGUs 102 may be supplied to the load 103 via power lines (transmission lines) between the power generation system 101 and the load 103. For an instance, the load 103 may be an electric load like a plurality of household appliances, large machineries used in the factories and the like. The power management system 104 manages the power generation by the power generation system 101. In an embodiment, the power management system 104 receives a power demand data from the load 103 connected to the power generation system 101. The power demand data is indicative of power required by the load 103 over a pre-defined time period. For an instance, the pre-defined time period may be a span of hours, days and the like. The power management system 104 uses the power demand data for determining a variation of power over the pre-defined time period. The variation of power indicates of an amount of power as required by the load 103 during various spans in the pre-defined time period. The power management system 104 identifies one or more intervals in the pre-defined time period. Further, the power management system 104 identifies a pattern in variation of power among various patterns for each of the one or more intervals. The power management system 104 determines an operational technique from one or more operational techniques and a repair technique from a plurality of repair techniques, for each of the one or more intervals based on the pattern. Based on the operational technique and the repair technique for the corresponding one or more intervals, the power management system 104 determines a plurality of working patterns for operating the plurality of PGUs 102 in each of the one or more intervals. Each of the plurality of working patterns is indicative of a number of PGUs operated in each of the one or more intervals. Thus, the power management system 104 determines an optimal working pattern in each of the one or more intervals such that the optimal working pattern satisfy the power demand in a given interval and also satisfies a plurality of constraints. Finally, the power management system 104 determines an amount of power to be generated by each PGU in the determined working pattern such that an optimal power generation criterion may be met.

Figure 2:
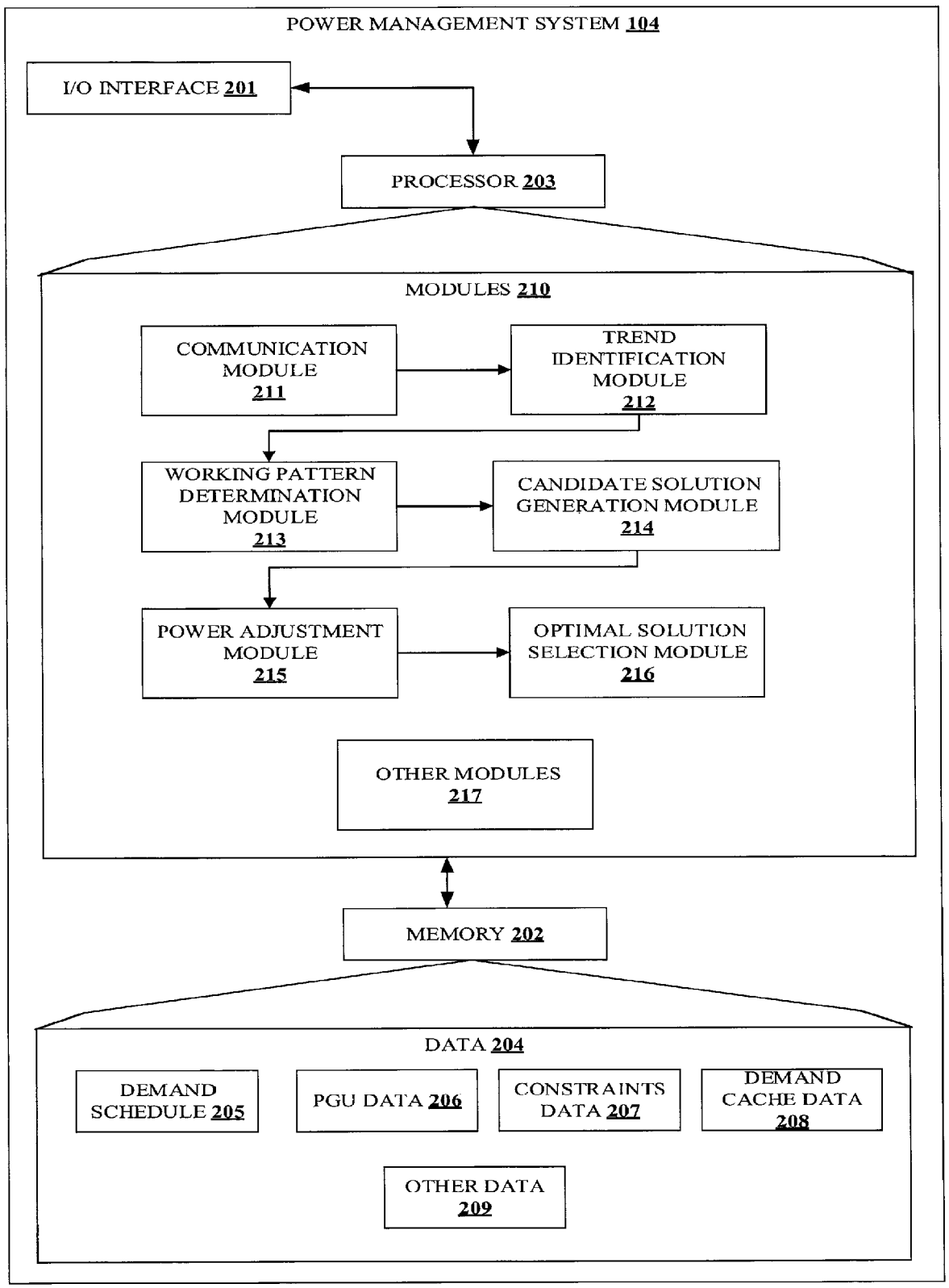
FIG. 2 shows an exemplary block diagram of a power management system for managing power generation, in accordance with some embodiments of the present disclosure.

FIG. 2 shows an exemplary block diagram of a power management system 104 for managing power generation of the power generation system 101, in accordance with some embodiments of the present disclosure. The power management system 104 may include at least one processor 203 and a memory 202 storing instructions executable by the at least one processor 203. The processor 203 may comprise at least one data processor for executing program components for executing user or system-generated requests. The memory 202 is communicatively coupled to the processor 203. The power management system 104 further comprises an Input/Output (I/O) interface 201. The I/O interface 201 is coupled with the processor 203 through which an input signal or/and an output signal is communicated. In an embodiment, the I/O interface 201 receives the power demand data and data related to the plurality of PGUs 102 from the power generation system 101.

In an embodiment, data 204 may be stored within the memory 202. The data 204 may include, for example, demand schedule 205, PGU data 206, constraints data 207, demand cache data 208 and other data 209. In another embodiment, the data 204 may be stored in a separate database associated with the power generation system 101. Further, the I/O interface 201 may receive the power demand data and data related to the plurality of PGUs 102 from the database.

In an embodiment, the demand schedule 205 may refer to amount of power required by the load 103 during the pre-defined time period. Consider an instance, where the pre-defined time period is 24 hours (1 day). Table 1 may indicate the power demand data over the 24 hours.

TABLE 1

| Hour of the day | Power demand (MW) |
| --- | --- |
| $1^{st}$ hour | 650 |
| $2^{nd}$ hour | 800 |
| $3^{rd}$ hour | 850 |
| $4^{th}$ hour | 980 |
| $5^{th}$ hour | 1000 |
| $6^{th}$ hour | 1100 |
| $7^{th}$ hour | 1190 |
| $8^{th}$ hour | 1200 |
| $9^{th}$ hour | 1300 |
| $10^{th}$ hour | 1400 |
| $11^{th}$ hour | 1430 |
| $12^{th}$ hour | 1450 |
| $13^{th}$ hour | 1380 |
| $14^{th}$ hour | 1300 |
| $15^{th}$ hour | 1200 |
| $16^{th}$ hour | 1150 |
| $17^{th}$ hour | 1000 |
| $18^{th}$ hour | 1150 |
| $19^{th}$ hour | 1200 |
| $20^{th}$ hour | 1350 |
| $21^{st}$ hour | 1300 |
| $22^{nd}$ hour | 1000 |
| $23^{rd}$ hour | 900 |
| $24^{th}$ hour | 800 |

As indicated in the Table 1, the power demand data is shown during various hours of the day. In the first hour the power demand is 650 MW, similarly in the 2nd hour the power demand has raised to 800 MW. Further, in the 17th hour the power demand has reduced to 1000 MW and further reduced to 800 MW during the 24th hour. Table 1 is an illustration of power demand data received by the power management system 104 from the power generation system 101 for a given day.

In an embodiment, the PGU data 206 may refer to the properties associated with each of the plurality of PGUs 102. The properties of each of the plurality of PGUs 102 may comprise, but are not limited to, maximum rated power of the PGU, minimum rated power of the PGU, uptime of PGU indicative of the minimum amount of time of operation of the PGU from initiation of the PGU, downtime of the PGU indicative of the minimum amount of idle time of the PGU after termination of the PGU.

In an embodiment, the constraints data 207 may refer to one or more constraint parameters. Each of the plurality of working patterns for operating the plurality of PGUs 102 in each of the one or more intervals is determined by the power management system 104 such that the plurality of PGUs 102 adhere to the one or more constraints and also meet the power demand during the corresponding one or more intervals. The one or more constraint parameters may comprise, but is not limited to power balance constraint, generation limit constraint, minimum uptime/downtime constraint, ramp up/down time constraint, lower and upper economic limits of active power generation of each PGU.

The cost function used to calculate the power generation costs according to a power generation plan and the corresponding constraints are described below.

Total Cost (TC) for 'T' hours scheduling horizon is determined using equation 1.

$$TC = \Sigma_{t=1}^{T} \Sigma_{i=1}^{N} [F_i(P_i^t) + SU_{i,t}(1-U_i^{t-1})]*U_i^t \quad (1)$$

$SU_{i,t} = HS_i$, if $T_{i,down} \leq T_{i,off}^t \leq T_{i,down} + T_{i,cold}$
$SU_{i,t} = CS_i$, if $T_{i,off}^t > T_{i,down} + T_{i,cold}$ Where,
N is the number of PGUs in the power system
$U_i^t$ is the status of $i^{th}$ unit at $t^{th}$ hour ('1' for ON and '0' for OFF)
$SU_{i,t}$ is the startup cost of $i^{th}$ unit at $t^{th}$ hour.
$HS_i$ and $CS_i$ are hot and cold start up costs of $i^{th}$ unit in $/h
T is total scheduling hours
$T_{i,down}$ is the minimum down time of $i^{th}$ unit in hours
$T_{i,cold}$ is the cold startup time for $i^{th}$ unit in hours
$T_{i,off}^t$ is the t number of hours the $i^{th}$ unit is continuously turned off.

Power balance constraint is determined by equation 2.

$\Sigma_{i=1}^{N} P_i^t * U_i^t = P_D^t$, where $P_D^t$ is the load at time $t$ in MW  (2)

Generation limit constraint is determined by equation 3.

$P_i^{min}*U_i^t \leq P_i^t \leq P_i^{max}*U_i^t$  (3)

where, $P_i^{min}$ is minimum power generation of $i^{th}$ unit in MW;
$P_i^{max}$ is maximum power generation of $i^{th}$ unit in MW;
minimum uptime/downtime constraint is determined by equation 4 and equation 5.

$U_i^t = 0 \rightarrow 1$, if $T_{i,off}^{t-1} \geq T_{i,down}$  (4)

$U_i^t = 1 \rightarrow 0$, if $T_{i,on}^{t-1} \geq T_{i,up}$  (5)

Where $T_{i,up}$ is the minimum up time of $i^{th}$ unit in hours;
$T_{i,down}$ is the minimum downtime of $i^{th}$ unit in hours
$T_{i,on}^{t-1}$ is the number of hours the $i^{th}$ unit is continuously turned on until time (t-1)
Ramp rates of PGUs are indicative of the constraint on the amount of increase or decrease of power generation. Further for a given working pattern to satisfy ramp rate constraints, a committed unit must generate power within a range $P_{i,t}^{min} \cdot P_{i,t} \leq P_{i,t}^{max}$.

Where, $[P_{i,t}^{min}, P_{i,t}^{max}]$ is the range of power to be generated by unit 'i' at time 't', which may be expressed as:

$$P_{i,t}^{min} = \begin{cases} \max(P_i^{min}, P_{i,t-1} - \rho_i^{down}), & \text{if } u_{i,t-1} = u_{i,t} = 1 \\ P_i^{min}, & \text{otherwise.} \end{cases}$$

$$P_{i,t}^{max} = \begin{cases} \min(P_i^{max}, P_{i,t-1} + \rho_i^{up}), & \text{if } u_{i,t-1} = u_{i,t} = 1 \\ P_i^{max}, & \text{otherwise.} \end{cases}$$

where
$\rho_i^{down}$ is the maximum ramp down rate in MW
$\rho_i^{up}$ is the maximum ramp up rate in MW.
Fuel cost at a certain time period t is determined using the equation 6

Fuel Cost, $C_t = \Sigma_{i=1}^{N} F_i(P_i^t)$ $/hr

Where,
$F_i(P_i^t) = (a_i + b_i P_i^t + c_i(P_i^t)^2) + |e_i \sin(f_i(P_i^{min} - P_i^t))|$ $/hr is the cost function which represents the input-output curve of $i^{th}$ PGU
$a_i$, $b_i$, $c_i$, $e_i$, and $f_i$ represent the fuel cost coefficients of $i^{th}$ PGU
Power generated by the $i^{th}$ unit.

Further the power management system 104 determines optimal power outputs of each of the plurality of PGUs 102 in the power generation system 101 for a single hour (say t=1) while meeting the following constraints:
System load (Power Balance Equation) $P_{load} = \Sigma_{i=1}^{N} P_i$, where, $P_{load}$ is Power load and Lower and upper economic limits of active power generation of each PGU is determined using equation 7.

$P_{min,i} \leq P_i \leq P_{max,i}$ $\forall i \in \{1, 2, \ldots, N\}$  (7)

where, N is the number of PGUs.

In an embodiment, the demand cache data 208 comprises a plurality of combinations of generating power using the number of PGUs operated in the determined working pattern based on maximum rated power and minimum rated power of the number of PGUs. The plurality of combinations (solution points) stored in the demand cache data 208 may be used for determining number of PGUs and the solution points for given demand and for given PGUs (already considered in past).

In an embodiment the other data 209 may include, but is not limited to, a plan data. The plan data may include a schedule of operational PGUs for each of the one or more intervals of the pre-defined time period. Consider an instance, where 4 PGUs, PGU 1, PGU 2, PGU 3 and PGU4 are to be operated. The plan data may have the schedule of operation as indicated in Table 2.

TABLE 2

| | Operational condition of PGU | | | |
|---|---|---|---|---|
| Hour of the day | PGU 1 | PGU 2 | PGU 3 | PGU 4 |
| $1^{st}$ hour | ON | OFF | OFF | ON |
| $6^{th}$ hour | OFF | ON | ON | ON |
| $12^{th}$ hour | ON | ON | OFF | OFF |
| $18^{th}$ hour | OFF | ON | OFF | ON |

In an embodiment, the data 204 in the memory 202 is processed by modules 210 of the power management system 104. As used herein, the term module refers to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality. The modules 210 when configured with the functionality defined in the present disclosure will result in a novel hardware. In an embodiment, the power management system 104 may be at least one of, but not limited to, a specific device, a specific circuitry comprising the processor 203 and the memory 202 along with other necessary components for performing the method steps as described in FIG. 3 and FIG. 4.

In one implementation, the modules 210 may include, for example, a communication module 211, a trend identification module 212, a working pattern determination module 213, a candidate solution generation module 214, a power adjustment module 215, an optimal solution selection module 216 and other modules 217. It will be appreciated that such aforementioned modules 210 may be represented as a single module or a combination of different modules. As illustrated in FIG. 2, connection (flow of data) between the modules 210 is indicated using arrows. It may be appreciated that the connection between the modules 210 may be modified and may not be specific to the connection illustrated in the FIG. 2.

In an embodiment, the communication module 211 facilitates communication between the power management system 104 and the power generation system 101. For example, the communication module 211 may receive the power demand data, properties of the plurality of PGUs 102 and the one or more constraint parameters from the power generation system 101.

In an embodiment, the trend identification module 212 identifies a pattern in variation of power among various patterns for each of the one or more intervals. The 212 uses the power demand data for determining a variation of power over the pre-defined time period. The variation of power indicates of an amount of power as required by the load 103 during various spans in the pre-defined time period. Further, the trend identification module 212 divides the pre-defined time period into the one or more intervals. The one or more intervals may be referred to as one or more planning regions hereafter in the present disclosure. The 212 identifies the pattern in variation of power among various patterns in each of the one or more planning intervals. The various patterns comprise at least one of an increase in the power demand over the interval, a decrease in power demand over the interval, constant power demand over the interval. Consider the Table 1, as indicated in the Table 1 the power demand is increasing from 650 MW in the $1^{st}$ hour to 1450 MW in the $12^{th}$ hour. Thus, if time interval between the first hour and the $12^{th}$ hour is considered as a first region, the power pattern in the first region is an increasing pattern (increasing trend). Similarly, there is a dip in the power demand in decreasing from 1350 in the $20^{th}$ hour to 800 in the $24^{th}$ hour. Thus, if time interval between the 20th hour and the $24^{th}$ hour is considered as a second region, the power pattern in the second region is a decreasing pattern (decreasing trend). Further, between the $13^{th}$ hour and the $19^{th}$ hour, the power demand initially decreases and further increases. Thus, if time interval between the $13^{th}$ hour and the $19^{th}$ hour is considered as a third region, the power pattern in the third region is a combination of the decreasing pattern and the increasing pattern. The power pattern in the third region may be referred as a valley pattern (valley trend).

In an embodiment, the one or more intervals and the power pattern in each of the one or more intervals may be determined using pre-defined statistical methods. In another embodiment, changepoint method may be used to split the pre-defined time period into the one or more intervals (one or more planning regions) and trend estimation method like moving averages or any other linear models may be used for identifying the power pattern in each of the one or more intervals. The power pattern may be referred to as trend hereafter in the present disclosure. Thus, the trend identification module 212 identifies the trend in each of the one or more planning regions. The trend may be increasing trend, decreasing trend, constant trend, valley trend.

In an embodiment, the working pattern determination module 213 determines the working pattern in each of the one or more intervals. Based on the identified trend in each of the one or more intervals, the working pattern determination module 213 determines from the one or more operational techniques and the repair technique from the plurality of repair techniques to be used in each of the one or more intervals for determining the working pattern.

In an embodiment the one or more operational techniques may comprise, but not limited to heuristic algorithm, meta-heuristic algorithms like genetic algorithm and hybrid algorithm. The operational technique along with the repair technique helps in determining the best working pattern based on the properties of the plurality of PGUs 102. Thus, the best working pattern indicates which PGU should be operational in the given interval such that the determined best working pattern satisfies the one or more constraint parameters and the power demand in the given interval. For an instance, consider 4 PGUs, PGU 1, PGU 2, PGU3 and PGU 4 are being operated in the power generation system 101. Based on the trend identified in a given interval and based on the properties of the 4 PGUs, the working pattern determination module 213 determines the best working pattern for the given interval such that the best working pattern adheres to the one or more constraints and the power demand in the given interval In an embodiment, the candidate solution generation module 214 generates plurality of combinations of generating power using the number of PGUs operated in the determined working pattern based on maximum rated power and minimum rated power of the number of PGUs. The plurality of combinations indicates possible solution points for each of the plurality of working patterns. The possible solution points indicate the amount of output power to be generated by each of the PGUs identified to be operational in a given working pattern. Consider an instance where among the 4 PGUs based on a working pattern the PGU 1 and the PGU 3 are to be operated in the given interval. Consider the power demand in the given interval is 600 MW. The 214 determines the amount of output power to be generated by the PGU 1 and the PGU 3 to adhere the one or more constraints and the power demand in the given interval. Further, the candidate solution generation module 214 may determine that the PGU 1 should be operated at maximum power and the PGU 1 should operate at a minimum power based on the fuel cost constraint.

In an embodiment, the candidate solution generation module 214 may choose at least one combination from the plurality of combinations stored in a cache associated with the power management system 104. The plurality of combinations of generating power may be stored in the cache. The cache may be accessed for operating the plurality of PGUs 102 in each of the plurality of working patterns.

In an embodiment, the power adjustment module 215 determines an amount of power generated by operating the number of PGUs in at least one combination of plurality of combinations of generating power. Further, the power adjustment module 215 determines excess power generated by the number of PGUs with respect to the power required by the load in the given interval. If the at least one combination is not adhering to the one or more constraints and the power demand in the given interval, the power adjustment module 215 updates the at least one combination by adjusting the power generated by the number of PGUs in the at least one combination. Further, the power adjustment module 215 deallocates the excess power by regulating the power generated by at least one PGU of the number of PGUs operating in a given working pattern. In an embodiment, the excess power generated by the operated PGUs is regulated using at least one of a gradient based technique and ranking technique.

In an embodiment, the optimal solution selection module 216 determines an optimal combination of power generation among the plurality of combinations such that the optimal combination of power generations adheres completely to the one or more constraints and the power demand.

In an embodiment, the other modules 217 may include, but are not limited to, demand change module and unit addition/deletion module. The demand change module determines a change in the power demand data and indicates the change in the power demand data. The unit addition/deletion module may indicate addition or deletion of a PGU to/from the power generation system 101.

Figure 3:
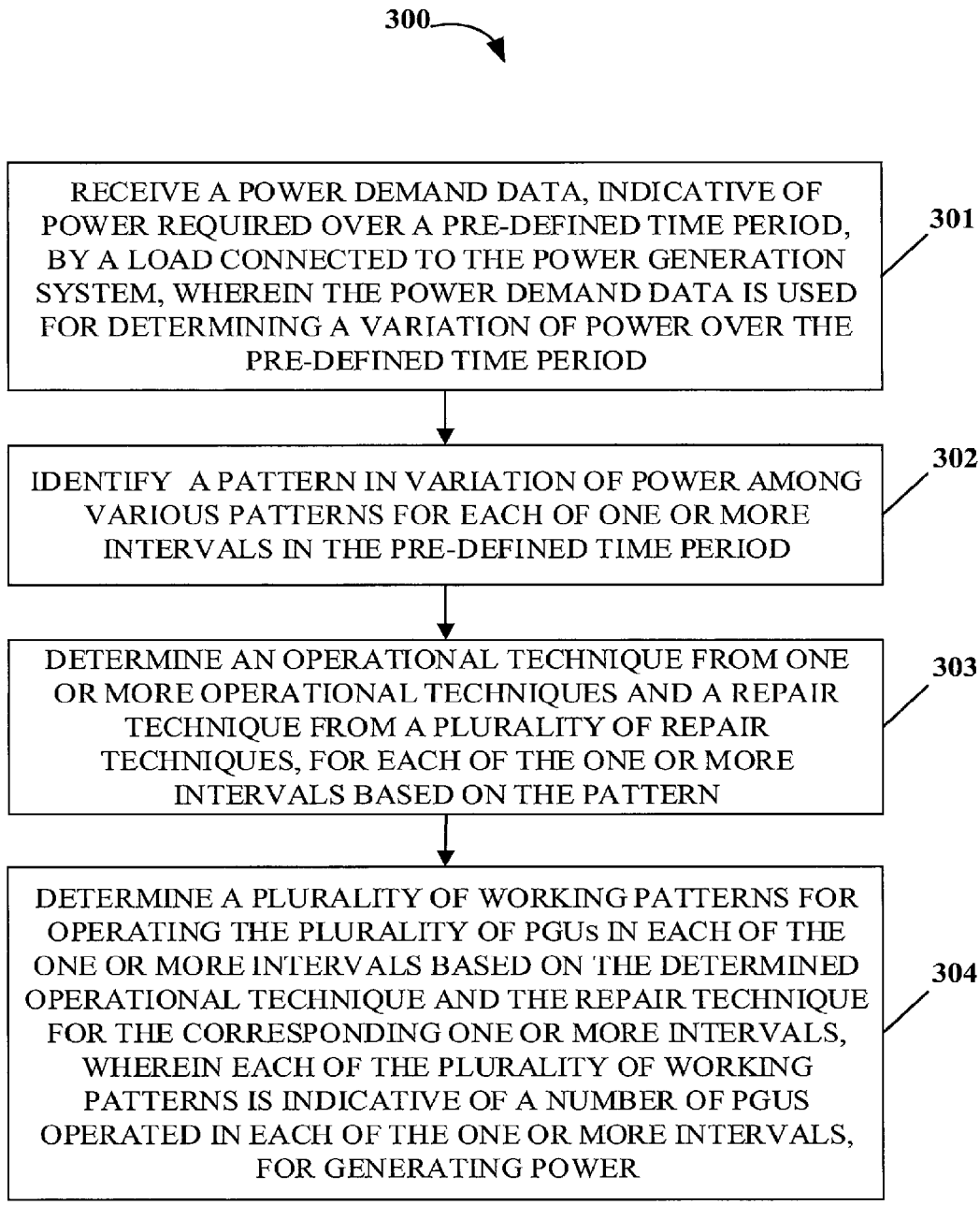
FIG. 3 shows an exemplary flow chart illustrating method steps for scheduling of power generation in a power generation system, in accordance with some embodiments of the present disclosure.
Figure 4:
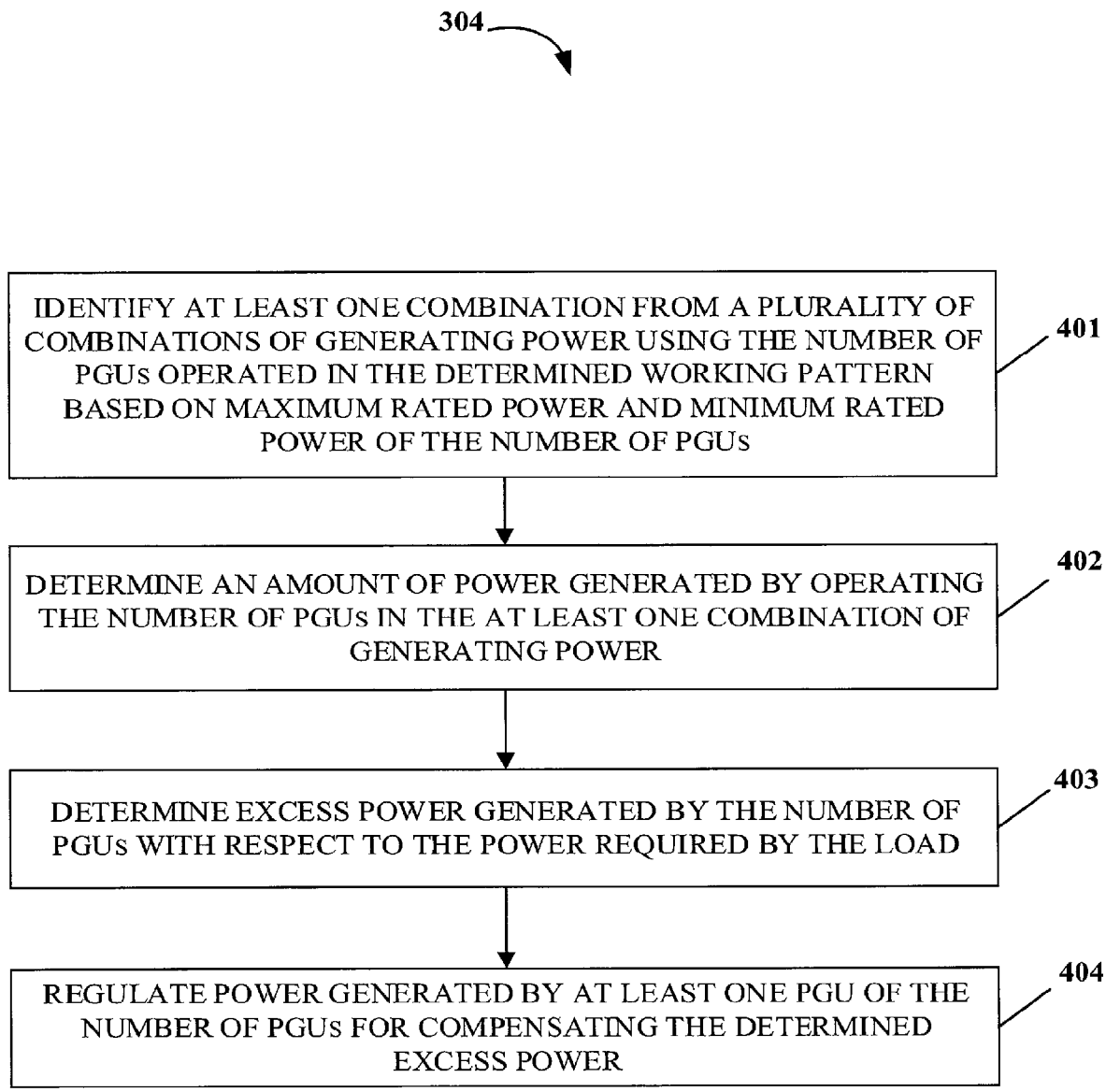
FIG. 4 shows an exemplary flow chart illustrating method steps for operating plurality of Power Generation Units (PGUs) in each of plurality of working patterns, in accordance with some embodiments of the present disclosure.

FIG. 3 shows an exemplary flow chart illustrating method steps for scheduling of power generation in a power generation system, in accordance with some embodiments of the present disclosure As illustrated in FIG. 3, FIG. 4 the method 300 and method 304 respectively may comprise one or more blocks for migrating applications into cloud platforms. The method 300 and method 304 may be described in the general context of computer executable instructions. Generally, computer executable instructions may include routines, programs, objects, components, data structures, procedures, modules, and functions, which perform particular functions or implement particular abstract data types.

The order in which the method 300 and method 304 is described is not intended to be construed as a limitation, and any number of the described method blocks may be combined in any order to implement the method. Additionally, individual blocks may be deleted from the methods without departing from the scope of the subject matter described herein. Furthermore, the method may be implemented in any suitable hardware, software, firmware, or combination thereof.

At step 301, the communication module 211 may receive the power demand data, properties of the plurality of PGUs 102 and the one or more constraint parameters from the power generation system 101. The power demand data may be received by the communication module 211 as indicated in Table 1.

At step 302, the trend identification module 212 identifies the pattern in variation of power among various patterns for each of the one or more intervals. The 212 uses the power demand data for determining a variation of power over the pre-defined time period. Further, the trend identification module 212 identifies the trend in each of the one or more planning regions of the pre-defined time period.

Figure 5:
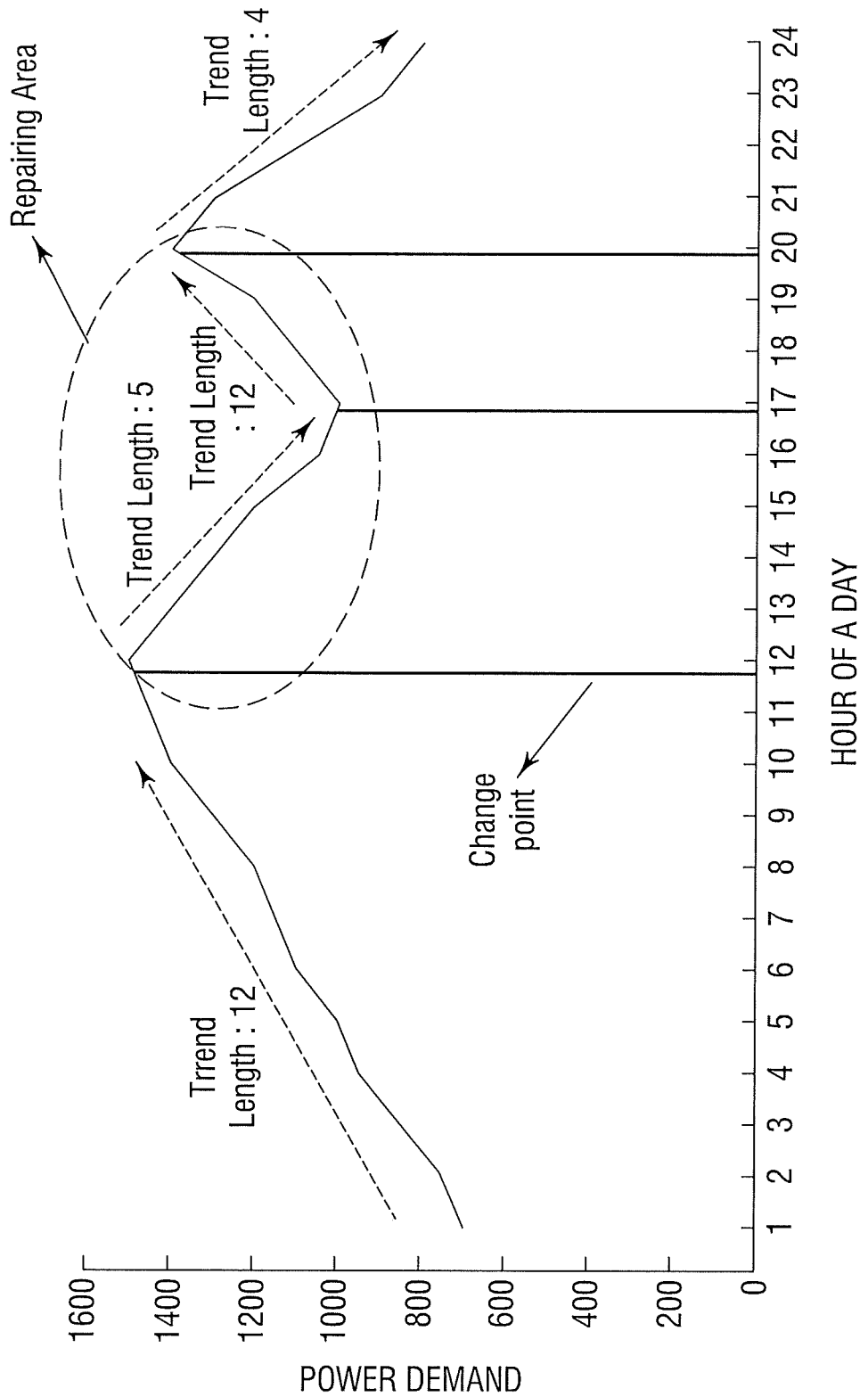
FIG. 5 illustrates a power demand curve generated, in accordance with some embodiments of the present disclosure.

FIG. 5 illustrates a power demand curve generated by the trend identification module 212 based on the power demand data indicated in Table 1. The power demand data is received over an entire day (24 hours). In an embodiment, the trend identification module 212 may employ changepoint method to divide the power demand curve into the one or more planning regions. Multiple changepoints may be identified in the power demand curve. As illustrated in FIG. 5, three changepoints may be identified in the power demand curve a first changepoint (Changepoint 1) at $12^{th}$ hour, a $2^{nd}$ changepoint (Changepoint 2) at the $17^{th}$ hour and a 3rd changepoint (Changepoint 3) at the $20^{th}$ hour. The changepoints are used to determine the one or more planning regions. One or more planning areas are determined by the trend identification module 212 based on distance between subsequent changepoints. In the power demand curve, the distances between the subsequent changepoints are estimated as indicated in Table 3 below.

TABLE 3

| Distance between changepoints | Trend | Trend length |
|---|---|---|
| Distance (Begin or Origin, Changepoint 1) | Trend 1 | 12 |
| Distance (Changepoint 1, Changepoint 2) | Trend 2 | 5 |
| Distance (Changepoint 2, Changepoint 3) | Trend 3 | 3 |
| Distance (Changepoint 3, End) | Trend 4 | 4 |

In an embodiment, if the consecutive trends length of the two planning regions is less than a given percentage, say 40% of the entire Power demand curve (i.e. 10), then the two planning regions may be clubbed into a valley region.
Length (Trend 1+Trend 2)=12+5=17>10
Length (Trend 2+Trend 3)=length (Trend_23)=5+3=8<10
Length (Trend_23+Trend 4)=8+4=12>10.

Therefore, the region between the origin and the first changepoint is a first region. The region between the first changepoint and the second changepoint is clubbed with the region between the second changepoint and the third changepoint into the valley region. The trend length over the valley region is less than 40% of the entire power demand curve. The region between the third changepoint and the end of the curve is a third region.

In an embodiment, the trend in each of the one or more planning regions may be identified using trend estimation methods like moving averages or generalized linear models. Thus, the trend in the first region is the increasing trend (as only rise in power demand is seen in the first region). The trend in the third region is the decreasing trend (as only fall in power demand is seen in the third region) and the trend in the valley region is valley trend (a combination of increasing trend and decreasing trend).

At step 303, the working pattern determination module 213 determines the operational technique from one or more operational techniques and the repair technique from the plurality of repair techniques, for each of the one or more intervals based on the trend.

For the power demand curve illustrated in FIG. 5, the operational techniques determined are as indicated in Table 4.

TABLE 4

| Trend in the region | Operational technique |
|---|---|
| First region: Increasing trend | Heuristic algorithm |
| Second region: valley trend | Meta-heuristic algorithm like Genetic algorithm |
| Third region: decreasing trend | Heuristic algorithm |

Further, the working pattern determination module 213 also determines the repair technique to be used in each of the one or more intervals based on the trend.

TABLE 5

| Trend in the region | Repair technique |
|---|---|
| First region: Increasing trend | Min Downtime |
| Second region: valley trend | Min Downtime, Min Uptime, Ramp rate |
| Third region: decreasing trend | Min Uptime |

As indicated in Table 4 and Table 5 for increasing trends, a heuristic algorithm is used. In heuristic algorithm and for increasing trend regions, incrementally PGUs are brought up by ranking of the PGUs based on cost, while satisfying constraints like minimum downtime. In heuristic algorithm and for decreasing trend regions, incrementally units are brought down by ranking of the PGUs based on cost, while satisfying constraints like minimum uptime. For valley regions, meta-heuristic algorithm such as, but not limited to, genetic algorithm may be used.

At step 304, the working pattern determination module 213 determines the plurality of working patterns for operating the plurality of PGUs 102 in each of the one or more intervals based on the determined operational technique and the repair technique for the corresponding one or more intervals. The operational technique along with the repair technique helps in determining the best working pattern based on the properties of the plurality of PGUs 102. Thus, the best working pattern indicates which PGU should be operational in the given interval such that the determined best working pattern satisfies the one or more constraint parameters and the power demand in the given interval.

The plurality of working patterns is determined by the working pattern determination module 213 for the one or more intervals based on the application of the operation technique and the repair technique.

FIG. 4 shows an exemplary flow chart illustrating method steps for operating the plurality of PGUs 102 in each of plurality of working patterns, in accordance with some embodiments of the present disclosure.

At step 401, the candidate solution generation module 214 generates plurality of combinations of generating power using the number of PGUs operated in the determined working pattern based on maximum rated power and minimum rated power of the number of PGUs. The plurality of combinations indicates possible solution points for each of the plurality of working patterns. The possible solution points indicate the amount of output power to be generated by each of the PGUs identified to be operational in a given working pattern.

Figure 6:
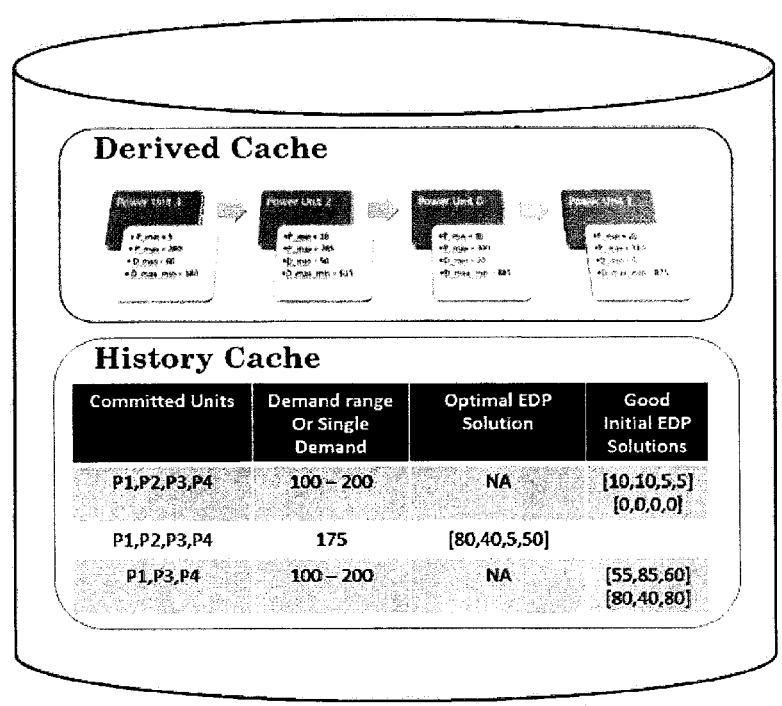
FIG. 6 illustrates a pictorial representation of the cache, in accordance with some embodiments of the present disclosure.

The candidate solution generation module 214 may choose at least one combination from the plurality of combinations stored in a cache associated with the power management system 104. The plurality of combinations of generating power may be stored in the cache. FIG. 6 illustrates a pictorial representation of the cache. The cache may comprise of two divisions, a derived cache and a history cache. The derived cache may be generated using power generation cost curves, properties of the plurality of PGUs 102 etc. The history cache stores initial solutions for a given demand. The cache will supply either already found solutions for a given demand and for given committed units, if available in best case.

Consider a first example, where the power generation system 101 comprises of 4 PGUs. The 4 PGUs include PGU 0, PGU 1, PGU 2 and PGU 3. Table 6 indicates the properties of the 4 PGUs.

TABLE 6

| PGU | $P_{MIN}$ | $P_{MAX}$ |
|---|---|---|
| PGU 0 | 30 | 300 |
| PGU 1 | 20 | 310 |
| PGU 2 | 10 | 285 |
| PGU 3 | 5 | 280 |

The candidate solution generation module 214 determines D_min [x] and D_max_min [x] for each of the PGUs.

D_min [x]=Minimum Demand that can be satisfied by units after Unit x in a sorted order.

D_max_min [x]=Sum of maximum demand that can be met by Unit x and D_min [x]

The 214 ranks the PGUs in a sorted order (ascending order) based on the $P_{MAX}$ value of each of the PGUs. Thereby, the sorted order as obtained from the Table 6 is Sorted order: PGU 3→PGU 2→PGU 0→PGU 1.

Further, the candidate solution generation module 214 computes the values of D_min [x] and D_max_min [x] for each of the PGUs in the sorted order Thus, for PGU 3, the D_min [x] is computed as shown below.

D_min [3]=Minimum Demand that can be satisfied by units after Unit 3. Based on the sorted order, D_min [3] is minimum demand that can be satisfied by PGU 2, PGU 0 and PGU 3.

Thus, D_min [3]=P_min[2]+P_min[0]+P_min[1]=10+30+20=60;

D_max_min [3]=P_max [3]+D_min[3]=280+60=340

Similarly, for PGU 2,

D_min [2]=P_min[0]+P_min[1]=50

D_max_min [2]=P_max [3]+P_max[2]+D_min[2]=285+280+50=615

The Table 6 is updated (indicated in Table 7) based on the values of D_min [x] and D_max_min [x].

TABLE 7

| PGU | $P_{MIN}$ | $P_{MAX}$ | D_min [x] | D_max_min [x] |
|---|---|---|---|---|
| PGU 3 | 5 | 280 | 60 | 340 |
| PGU 2 | 10 | 285 | 50 | 615 |
| PGU 0 | 30 | 300 | 20 | 885 |
| PGU 1 | 20 | 310 | 0 | 875 |

From Table 7 d_max_min [x]=[340, 615, 885, 875].

Consider a first instance. Let the power demand be 300 MW in the first hour. The initial solution determined based on the Table 6 may be [P3, P2, P0, P1]. The 214 determines the plurality of combinations based on the initial solution. The solution points generated may be as indicated below.

First solution point (SP1)=[P_max[3], P_min[2], P_min [1], P_min [0] ]=[280, 10, 30, 20]

Second solution point (SP2)=[P_max[3], P_max[2], P_min[1], P_min [0] ]=[280, 285, 30, 20]

Third solution point (SP3)=[P_max[3], P_max[2], P_max [1], P_min [0] ]=[280, 285, 300, 20]

Fourth solution point (SP4)=[P_max[3], P_max[2], P_max[1], P_max[0] ]=[280, 285, 300, 310]

The above-mentioned solution points may be stored in the cache. Further, consider a second instance. Let the power demand be 800 MW in the second hour (assuming the similar committed units are present). The initial solution points may be obtained from the cache, d_max_min=[340, 615, 885, 875]. Based on the power demand, the third solution point and the fourth solution point may be chosen as the solution points for the second hour.

Considering the first instance, the power demand is 300 MW and the candidate solution generation module 214 now searches in D_max_min [x] where the value is greater than or equal to the power demand. Further the candidate solution generation module 214 determines the plurality of combinations as determined above.

Consider the first solution point (SP1)=[280, 10, 30, 20]

At step 402, the power adjustment module 215 determines the amount of power generated by operating the number of PGUs in the at least one combination of generating power.

Power Sum for SP1=280+10+30+20=340 MW.

At step 403, the power adjustment module 215 determines excess power generated by the number of PGUs with respect to the power required by the load in the given interval. The power sum for SP1 is greater than the power demand for the first hour. The power sum is computed using equation Excess power=power sum−power demand (8)

Thus, the excess power generated using the SP1 is 340−300=40 MW.

At step 404, the power adjustment module 215 regulates power generated by at least one PGU of the number of PGUs for compensating the determined excess power. Further, if the at least one combination is not adhering to the one or more constraints and the power demand in the given interval, the power adjustment module 215 updates the at least one combination by adjusting the power generated by the number of PGUs in the at least one combination. Further, the power adjustment module 215 deallocates the excess power by regulating the power generated by at least one PGU of the number of PGUs operating in a given working pattern. In an embodiment, the excess power generated by the operated PGUs is regulated using at least one of a gradient based technique and ranking technique.

Considering the first instance, the excess power of 40 MW is deallocated using gradient based deallocation.

The gradient for L is calculated as below and the new values of $\lambda$, $P_1$, $P_2$, . . . , $P_N$ are found from $x^k = x^{k-1} - (\nabla L)*$learn rate, if (P_min<$x^k$<P_max):

$\lambda^k = \lambda^{k-1} + \text{DelP}*\text{learning rate}$, where, $\text{DelP} = P_{load} - \Sigma_{i=1}^{N} Pi$ $$\nabla L = \begin{bmatrix} \frac{\partial L}{\partial P_1} \\ \frac{\partial L}{\partial P_2} \\ \vdots \\ \frac{\partial L}{\partial P_N} \\ \frac{\partial L}{\partial \lambda} \end{bmatrix} = \begin{bmatrix} \frac{dF_1(P_1)}{dP_1} - \lambda \\ \frac{dF_2(P_2)}{dP_2} - \lambda \\ \vdots \\ \frac{dF_N(P_N)}{dP_N} - \lambda \\ P_{load} - \sum_{i=1}^{N} P_i \end{bmatrix}$$

Where, vector $x = [P_1, P_2, \ldots, P_N]^T$ and the original function is given by:

$$L = \Sigma_{i=1}^{N} Fi(Pi) + \lambda(P_{load} - \Sigma_{i=1}^{N} Pi)$$

Few iterations are iterated using the above gradient and satisfying the maximum and minimum power conditions to reduce the excess power. Assuming that based on the gradient method the excess power is reduced to 10 MW from 40 MW.

Thus, the SP1 is modified to [250, 10, 30, 20].

The remaining excess power of 10 MW is deallocated using the ranking based method. The excess power of 10 MW is deallocated from the PGUs with higher cost in decreasing order. Considering the solution SP1. The decreasing cost order is [PGU 1, PGU 0, PGU 2, PGU 3]. Thus, SP1 in terms of the decreasing cost order is SP1=[20, 30, 10, 250]

Considering PGU 1: Since PGU 1 is already at a minimum power (20), power cannot be deallocated from PGU 1.

Considering PGU 0: Since PGU 0 is already at a minimum power (30), power cannot be deallocated from PGU 0.

Considering PGU 3: power can be deallocated from the PGU 3 since current value—deallocation is greater than the Pmin of PGU 3. Therefore, 10 MW is deallocated from PGU 3 Since PGU 1 is already at a minimum power, power cannot be deallocated from PGU1. Thus, SP1 in terms of decreasing order=[20, 30, 10, 240]

Final ranking-based solution P values=[PGU 0, PGU 1, PGU 2, PGU 3]=[30, 20, 10, 240] with power sum=300. Thus, the excess power is reduced to 0.

Computer System

Figure 7:
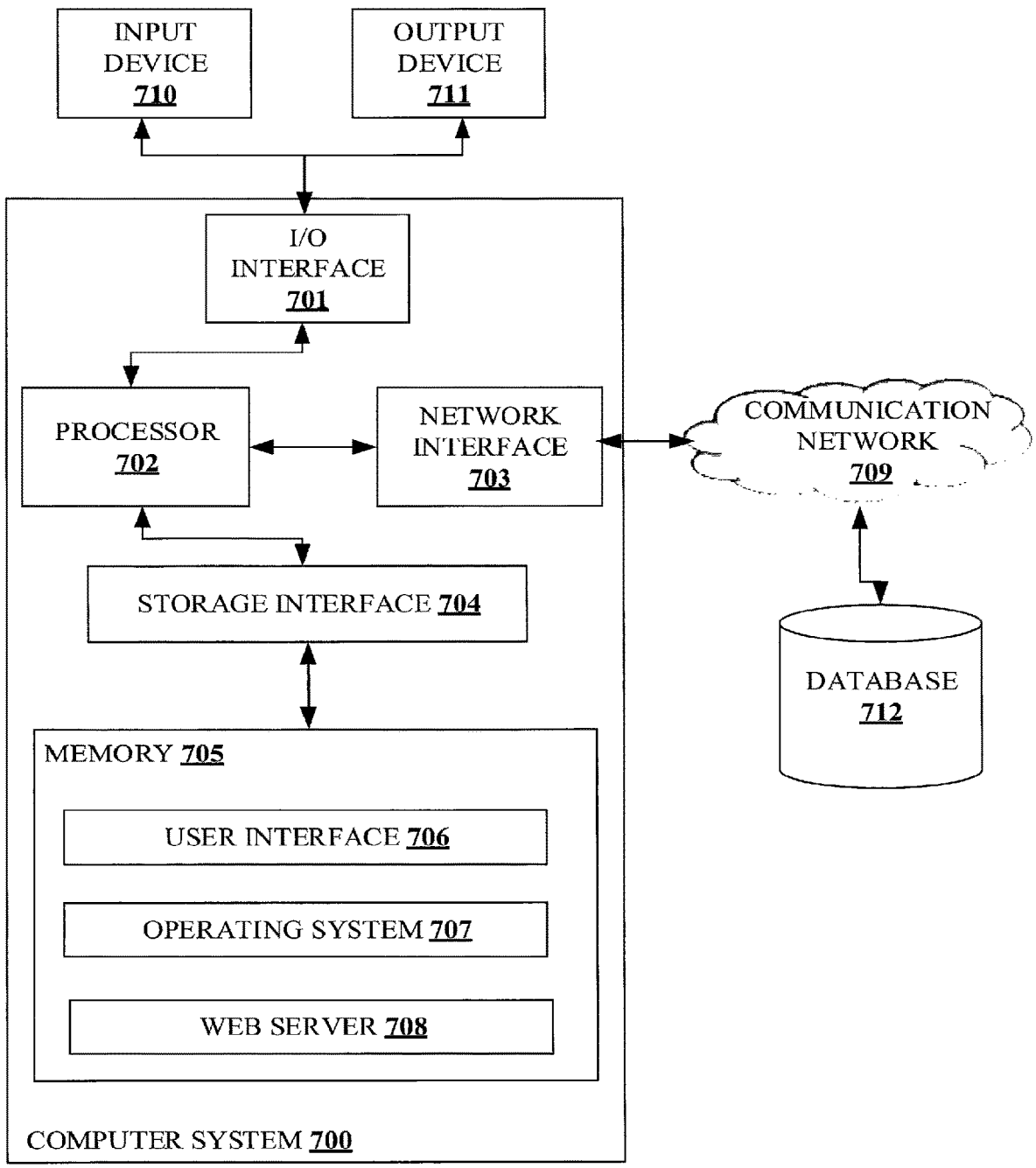
FIG. 7 illustrates a block diagram of a general-purpose computer system for implementing embodiments consistent with the present disclosure.

FIG. 7 illustrates a block diagram of an exemplary computer system 700 for implementing embodiments consistent with the present disclosure. In an embodiment, the computer system 700 is used to implement the power management system 104. The computer system 700 may include a central processing unit ("CPU" or "processor") 702. The processor 702 may include at least one data processor for executing program components for power generation planning in a power generation system. The processor 702 may include specialized processing units such as integrated system (bus) controllers, memory management control units, floating point units, graphics processing units, digital signal processing units, etc.

The processor 702 may be disposed in communication with one or more input/output (I/O) devices (not shown) via I/O interface 701. The I/O interface 701 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 701, the computer system 700 may communicate with one or more I/O devices. For example, the input device 710 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 711 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 700 is connected to the database 712 through a communication network 709. The database 712 may be associated with the power generation system. Further, the I/O interface 701 may receive the power demand data and data related to the plurality of PGUs 102 from the database 712. The processor 702 may be disposed in communication with the communication network 709 via a network interface 703. The network interface 703 may communicate with the communication network 709. The network interface 703 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 709 may include, without limitation, a direct interconnection, local area network (LAN), wide area network (WAN), wireless network (e.g., using Wireless Application Protocol), the Internet, etc. Using the network interface 703 and the communication network 709, the computer system 700 may communicate with the knowledge graph 712 and the database 713. The network interface 703 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 709 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 702 may be disposed in communication with a memory 705 (e.g., RAM, ROM, etc. not shown in FIG. 7) via a storage interface 704. The storage interface 704 may connect to memory 705 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 705 may store a collection of program or database components, including, without limitation, user interface 706, an operating system 707, web server 708 etc. In some embodiments, computer system 700 may store user/application data 706, such as, the data, variables, records, etc., as described in this disclosure. Such databases may be implemented as fault-tolerant, relational, scalable, secure databases such as Oracle® or Sybase®.

The operating system 707 may facilitate resource management and operation of the computer system 700. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system 700 may implement a web browser 708 stored program component. The web browser 708 may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 708 may utilize facilities such as AJAX™, DHTML™, ADOBE® FLASH™, JAVASCRIPT™, JAVA™, Application Programming Interfaces (APIs), etc. In some embodiments, the computer system 700 may implement a mail server stored program component. The mail server may be an Internet mail server such as Microsoft Exchange, or the like. The mail server may utilize facilities such as ASP™, ACTIVEX™, ANSI™ C++/C#, MICROSOFT®, .NET™, CGI SCRIPTS™, JAVA™ JAVASCRIPT™, PERL™ PHP™ PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 700 may implement a mail client stored program component. The mail client may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated method of FIG. 3, FIG. 4 shows certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

In an embodiment, the system, method and device as disclosed in the present disclosure, may be used in real-time for managing power generation in a power generation system.

In an embodiment, the system, method and device as disclosed in the present disclosure, may be used for scheduling (ON/OFF) and dispatching available resources to meet a given power demand in a most economic manner such as scheduling and dispatching available power generation resources to meet, or supply a given load in a control area in terms of fuel cost, startup cost and execution time.

In an embodiment, the system, method and device as disclosed in the present disclosure, may be applicable/extendable to any resource allocation problem like "Multi-Robot Task Allocation", "Distributed task allocation for Multi-Agent systems operating under constrained environment".

In an embodiment, the system, method and device as disclosed in the present disclosure, reduces the search space significantly generated a power generation plan satisfying all the constraints in a shorter time with cheaper power generation cost.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference number | Description |
| --- | --- |
| 100 | Environment |
| 101 | Power generation system |
| 102 | Plurality of PGUs |
| 103 | Load |
| 104 | Power management system |

-continued

| Reference number | Description |
| --- | --- |
| 201 | I/O interface |
| 202 | Memory |
| 203 | Processor |
| 204 | Data |
| 205 | Power schedule |
| 206 | PGU data |
| 207 | Constraints data |
| 208 | Demand cache data |
| 209 | Other data |
| 210 | Modules |
| 211 | Communication module |
| 212 | Trend identification module |
| 212 | Working pattern determination module |
| 214 | Candidate solution generation module |
| 215 | Power adjustment module |
| 216 | Optimal solution selection module |
| 217 | Other modules |
| 700 | Computer System |
| 701 | I/O Interface of the exemplary Computer system |
| 702 | Processor of the exemplary Computer system |
| 703 | Network Interface |
| 704 | Storage Interface |
| 705 | Memory of the exemplary Computer system |
| 706 | User Interface of the exemplary Computer system |
| 707 | Operating System |
| 708 | Web Server |
| 709 | Communication Network |
| 710a, . . . , 710n | Input Devices |
| 711a, . . . , 711n | Output device |
| 712 | Database |

We claim:

1. A method for power generation planning in a power generation system, wherein the power generation system comprises a plurality of Power Generation Units (PGUs) configured to generate power, the method comprising:

receiving, by a power management system, a power demand data indicative of power required over a pre-defined time period, the power being required by a load connected to the power generation system, wherein the power demand data is used for determining a variation of power over the pre-defined time period;

identifying, by the power management system, a pattern in the variation of power among various patterns for each of plurality of intervals in the pre-defined time period;

determining, by the power management system, an operational technique from plurality of operational techniques and a repair technique from a plurality of repair techniques, for each of the plurality of intervals based on the pattern, the operational technique being used for operating the plurality of PGUs, the repair technique being used for controlling plurality of constraint parameters used in the operational technique, the operational technique and the repair technique being determined depending on whether a power demand curve indicates an increasing trend, a valley trend, or a decreasing trend with respect to time, wherein the power demand curve is divided into at least three planning regions, two of the three planning regions being clubbed into a valley region with the valley trend when consecutive trends length of the two planning regions is less than a given percentage threshold of the power demand curve; and determining, by the power management system, a plurality of working patterns for operating the plurality of PGUs in each of the plurality of intervals based on the determined operational technique and the repair technique for corresponding plurality of intervals, wherein each of the plurality of working patterns corresponds to each of PGUs operated in each of the corresponding plurality of intervals.

2. The method as claimed in claim 1, wherein operating the plurality of PGUs in each of the plurality of intervals comprises:
identifying at least one combination from a plurality of combinations of the PGUs operated in the determined working patterns based on maximum rated power and minimum rated power in each of the PGUs;
determining an amount of power generated by operating the PGUs in the at least one combination;
determining excess power generated by the PGUs with respect to the power required by the load; and
regulating power generated by at least one PGU of the PGUs for compensating the determined excess power.

3. The method as claimed in claim 2, wherein the excess power generated by the operated PGUs is regulated using at least one of a gradient based technique or ranking technique.

4. The method as claimed in claim 2, wherein information on the plurality of combinations of the PGUs is stored in a cache associated with the power management system and wherein the cache is accessed for operating the plurality of PGUs in each of the plurality of working patterns.

5. The method as claimed in claim 1, wherein each of the working patterns is determined based on properties of the plurality of PGUs, the properties comprising maximum rated power, minimum rated power, uptime of PGU indicative of the minimum amount of time of operation of the PGU from initiation of the PGU, and downtime of the PGU indicative of the minimum amount of idle time of the PGU after termination of the PGU.

6. The method as claimed in claim 1, wherein the various patterns comprises at least one of constant power demand, an increase in power demand, and a decrease in power demand, and wherein the plurality of intervals are determined using pre-defined statistical methods.

7. The method as claimed in claim 1, wherein the plurality of operational techniques comprise at least one of heuristic algorithm or meta-heuristic algorithms.

8. The method as claimed in claim 1, wherein each of the plurality of repair techniques is used for controlling plurality of constraint parameters used by operating the plurality of PGUs in each of the plurality of intervals and wherein the plurality of constraint parameters are at least one of minimum uptime/downtime constraint, ramp up/down rate constraint, or ramp up/down time constraint.

9. A power management system for power generation planning in a power generation system, wherein the power generation system comprises a plurality of Power Generation Units (PGUs) configured to generate power, the power management system comprising:
a processor; and
a memory, communicably coupled with the processor, storing processor executable instructions, which, on execution causes the processor to:
receive, a power demand data indicative of power required over a pre-defined time period, the power being required by a load connected to the power generation system, wherein the power demand data is used for determining a variation of power over the pre-defined time period;
identify a pattern in the variation of power among various patterns for each of plurality of intervals in the pre-defined time period;
determine an operational technique from plurality of operational techniques and a repair technique from a plurality of repair techniques, for each of the plurality of intervals based on the pattern, the operational technique being used for operating the plurality of PGUs, the repair technique being used for controlling plurality of constraint parameters used in the operational technique, the operational technique and the repair technique being determined depending on whether a power demand curve indicates an increasing trend, a valley trend, or a decreasing trend with respect to time, wherein the power demand curve is divided into at least three planning regions, two of the three planning regions being clubbed into a valley region with the valley trend when consecutive trends length of the two planning regions is less than a given percentage threshold of the power demand curve; and
determine a plurality of working patterns for operating the plurality of PGUs in each of the plurality of intervals based on the determined operational technique and the repair technique for corresponding plurality of intervals, wherein each of the plurality of working patterns corresponds to each of PGUs operated in each of the corresponding plurality of intervals.

10. The power management system as claimed in claim 9, wherein operating the plurality of PGUs in each of the plurality of intervals comprises:
identifying at least one combination from a plurality of combinations of the PGUs operated in the determined working patterns based on maximum rated power and minimum rated power in each of the PGUs;
determining an amount of power generated by operating the PGUs in the at least one combination;
determining excess power generated by the PGUs with respect to the power required by the load; and
regulating power generated by at least one PGU of the PGUs for compensating the determined excess power.

11. The power management system as claimed in claim 10, wherein the excess power generated by the operated PGUs is regulated using at least one of a gradient based technique or ranking technique.

12. The power management system as claimed in claim 10, wherein information on the plurality of combinations of the PGUs is stored in a cache associated with the power management system and wherein the cache is accessed for operating the plurality of PGUs in each of the plurality of working patterns.

13. The power management system as claimed in claim 9, wherein each of the working patterns is determined based on properties of the plurality of PGUs, the properties comprising maximum rated power, minimum rated power, uptime of PGU indicative of the minimum amount of time of operation of the PGU from initiation of the PGU, and downtime of the PGU indicative of the minimum amount of idle time of the PGU after termination of the PGU.

14. The power management system as claimed in claim 9, wherein the various patterns comprises at least one of constant power demand, an increase in power demand, and a decrease in power demand, and wherein the plurality of intervals are determined using pre-defined statistical methods.

15. The power management system as claimed in claim 9, wherein the plurality of operational techniques comprise at least one of heuristic algorithm or meta-heuristic algorithms.

16. The power management system as claimed in claim 9, wherein each of the plurality of repair techniques is used for controlling plurality of constraint parameters used by operating the plurality of PGUs in each of the plurality of intervals and wherein the plurality of constraint parameters are at least one of minimum uptime/downtime constraint, ramp up/down rate constraint, or ramp up/down time constraint.

17. A power management device for power generation planning in a power generation system, wherein the power generation system comprises a plurality of Power Generation Units (PGUs) configured to generate power, wherein the power management device comprises a circuitry configured to:
receive a power demand data indicative of power required over a pre-defined time period, the power being required by a load connected to the power generation system, wherein the power demand data is used for determining a variation of power over the pre-defined time period;
identify a pattern in the variation of power among various patterns for each of plurality of intervals in the pre-defined time period;
determine an operational technique from plurality of operational techniques and a repair technique from a plurality of repair techniques, for each of the plurality of intervals based on the pattern, the operational technique being used for operating the plurality of PGUs, the repair technique being used for controlling plurality of constraint parameters used in the operational technique, the operational technique and the repair technique being determined depending on whether a power demand curve indicates an increasing trend, a valley trend, or a decreasing trend with respect to time, wherein the power demand curve is divided into at least three planning regions, two of the three planning regions being clubbed into a valley region with the valley trend when consecutive trends length of the two planning regions is less than a given percentage threshold of the power demand curve; and
determine a plurality of working patterns for operating the plurality of PGUs in each of the plurality of intervals based on the determined operational technique and the repair technique for corresponding plurality of intervals, wherein each of the plurality of working patterns corresponds to each of PGUs operated in each of the corresponding plurality of intervals.

18. The power management device as claimed in claim 17, wherein operating the plurality of PGUs in each of the plurality of intervals comprises:
identifying at least one combination from a plurality of combinations of the PGUs operated in the determined working patterns based on maximum rated power and minimum rated power in each of the PGUs;
determining an amount of power generated by operating the PGUs in the at least one combination;
determining excess power generated by the PGUs with respect to the power required by the load; and
regulating power generated by at least one PGU of the PGUs for compensating the determined excess power.

19. A non-transitory computer readable medium including instructions stored thereon that when processed by at least one processor cause a power management system to perform operations comprising:
receiving a power demand data indicative of power required over a pre-defined time period, the power being required by a load connected to the power management system, wherein the power demand data is used for determining a variation of power over the pre-defined time period;
identifying a pattern in variation of power among various patterns for each of plurality of intervals in the pre-defined time period;
determining an operational technique from plurality of operational techniques and a repair technique from a plurality of repair techniques, for each of the plurality of intervals based on the pattern, the operational technique being used for operating a plurality of Power Generation Units (PGUs), the repair technique being used for controlling plurality of constraint parameters used in the operational technique the operational technique and the repair technique being determined depending on whether a power demand curve indicates an increasing trend, a valley trend, or a decreasing trend with respect to time, wherein the power demand curve is divided into at least three planning regions, two of the three planning regions being clubbed into a valley region with the valley trend when consecutive trends length of the two planning regions is less than a given percentage threshold of the power demand curve; and
determining a plurality of working patterns for operating the plurality of PGUs in each of the plurality of intervals based on the determined operational technique and the repair technique for corresponding plurality of intervals, wherein each of the plurality of working patterns corresponds to each of PGUs operated in each of the corresponding plurality of intervals.

20. The medium as claimed in claim 19, wherein operating the plurality of PGUs in each of the plurality of intervals comprises:
identifying at least one combination from a plurality of combinations of the PGUs operated in the determined working patterns based on maximum rated power and minimum rated power in each of the PGUs;
determining an amount of power generated by operating the PGUs in the at least one combination;
determining excess power generated by the PGUs with respect to the power required by the load; and
regulating power generated by at least one PGU of the PGUs for compensating the determined excess power.

* * * * *